United States Patent [19]

Samis

[11] 3,946,332

[45] Mar. 23, 1976

[54] HIGH POWER DENSITY CONTINUOUS WAVE PLASMA GLOW JET LASER SYSTEM

[76] Inventor: Michael A. Samis, 726 Orchard St., No. 7, Santa Rosa, Calif. 95404

[22] Filed: June 13, 1974

[21] Appl. No.: 479,102

[52] U.S. Cl. ...... 331/94.5 PE; 331/94.5 G; 330/4.3; 313/231.5; 313/231.6
[51] Int. Cl.$^2$ .................... H01S 3/097; H01S 3/22
[58] Field of Search................ 331/94.5; 330/4.3; 313/231.5, 231.6

[56] References Cited
UNITED STATES PATENTS

| | | | |
|---|---|---|---|
| 3,007,072 | 10/1961 | McGinn et al. | 313/231.5 |
| 3,671,883 | 6/1972 | Smars | 313/231.5 X |

OTHER PUBLICATIONS

Brunet et al. AIAA Paper No. 72-725, 5th Fluid & Plasma Dynamics Conf., June, 1972, pp. 1-7.

Primary Examiner—Robert J. Webster
Attorney, Agent, or Firm—George B. White; David E. Newhouse

[57] ABSTRACT

A high power density continuous wave (c. w.) gas dynamic laser system is described which includes a non-equilibrium plasma jet for generating excited gaseous species having high vibrational temperature and low gas temperature. Gas flow through the plasma jet is reduced to highly turbulent subsonic flow by an expanding nozzle. Lasing in an optical cavity oriented transversely with respect to the flow of the gaseous plasma extracts vibrational energy from the excited gaseous species as the emerge from the expansion nozzle.

The described system also includes, immediately upstream from the optical cavity, an injection system which introduces and uniformly mixes a lasing gaseous species into the highly turbulent subsonic gaseous plasma flow from the plasma jet. Gas sweeps are established in the arms of the optical cavity to cool and sweep high temperature unexcited gas species therefrom in order to reduce absorption in the optical cavity.

The described laser system can be adapted for either open cycle or closed cycle operation depending upon the gaseous mediums utilized. A particular carbon dioxide - nitrogen gas dynamic laser system is described which has a gain coefficient of 32/m at 20 torr of carbon dioxide and 40 torr of nitrogen with an estimated power density of approximately 1000 W/cm$^3$, a saturation parameter of approximately 2000 W/cm$^2$ and an estimated overall efficiency of approximately 24 percent..

53 Claims, 15 Drawing Figures

THE RELEVANT LEVELS FOR He-Cd ARE:

VIBRATIONAL ENERGY LEVELS OF $CO_2$ AND $N_2$

HIGH POWER DENSITY CONTINUOUS WAVE PLASMA GLOW JET LASER SYSTEM

BACKGROUND OF THE INVENTION

1. Field of the Invention

The invention relates to a high power continuous wave transverse gas dynamic laser system generally and to a plasma jet gas dynamic laser system specifically.

2. Description of the Prior Art

The optimum laser system is one which operates close to theoretical efficiency, generates a good quality laser beam (low divergence, single mode and stable position) and has practical operating conditions. An important factor in gas laser systems meant for industrial use is high overall power efficiency, which considers both the power for driving the laser and the power expended in pumping the gas through the system. Efficiency in a gas laser system relates to a high gain coefficient, an efficient exciting system, a moderate gas flow rate and a minimum of mirrors and windows. A high gain coefficient means that the volume of the active medium can be decreased, which in turn reduces wall deactivation losses and reduces the physical size of the system.

In a gas dynamic laser system the power output of the system is generally expressed as follows: laser power gained from excited flowing gas species equals power transmitted through mirrors plus mirror losses and diffraction losses. For a laser having a given active length, a gain medium of higher power density will have a higher value of power gained from the medium. Also, increasing the gain allows the mirror transmission to be increased. Specifically, power flux through a mirror is a product of the incident flux and the mirror transmission. Assuming a constant output flux, increasing the mirror transmission decreases the incident flux thereon and thereby minimizes the possibility of mirror damage and also minimizes mirror losses.

Mirrors impose an important design restraint on continuous wave carbon dioxide gas laser systems in that the maximum incident flux (I) they can accept without damage is approximately 5000 W/cm$^2$.

The efficiency of a gas dynamic laser system utilizing an electrical discharge to excite the gain medium also depends on the efficiency of the electrical discharge in exciting the working gases of the system. The electrical discharge should be stable and operate at an electron temperature where the amount of energy transferred to the desired vibrational levels of the gaseous gain medium is close to the theoretical maximum. The discharge electrodes should be designed for minimal absorption of energy from the discharge due to vibrational wall deactivation.

The gaseous medium should gain only minimal translational energy from the discharge. Specifically, gaseous species having a high translational (kinetic) energy or temperature are an absorbing medium; whereas gaseous species having a high vibrational energy or temperature are an amplifying medium. Generally, the translational energy which a gaseous medium gains from an electrical discharge is directly proportional to the time the gaseous medium is in the discharge (residence time) and to the current density of the discharge.

The quality of an electrical discharge system for a gas laser can be described in terms of the specific power of the laser system. Specific power is defined as the maximum theoretical power obtainable from the laser system ($P_{max}$) divided by the total mass flow rate of gases through the system ($Q_{Tot}$). A specific value of translational energy increase is assumed. For example, if the electrical discharge creates gaseous species having a high kinetic or translational temperature, the actual specific power of the system decreases since such gas species comprise an absorbing medium in the laser system. Similarly, if the electrical discharge of the system creates gaseous species having a high vibrational temperature, the actual specific power of the system increases since such gaseous species are the gain medium.

An electrical discharge which produces excited gaseous species in which the translational (kinetic) temperature approaches that of the electronic or vibrational temperature is referred to as an "arc discharge", while an electrical discharge which produces excited gaseous species having a lower translational temperature than the electronic or vibrational temperatures is referred to as aa "glow discharge". An arc discharge is undesirable in a gas laser system in that it produces an energy distribution unfavorable for lasing action in a gaseous gain medium. Furthermore, arc discharges are spatially inhomogeneous.

Another factor affecting the overall efficiency of a gas dynamic laser system is the flow rate of the gas through the system. Specifically, the power consumed by the pumps reduces overall efficiency of the laser system. Accordingly, it is desirable to have a minimum gas flow rate through the system in order to minimize pump power consumption.

Other desirable features of a gas dynamic flow laser system are as follows: homogeneous active medium, compact size, simple construction, reliability, stability, low operating voltage, high power density, metal construction and Gaussian gain distribution. Moreover, open circulation gas dynamic laser systems are preferred over closed circulation systems. Specifically, in an open system, the heated working gases are expelled into the atmosphere after the vibrational energy has been extracted, eg. a carbon dioxide - nitrogen laser system. Closed circulation systems are those in which it is either uneconomic or dangerous to expel the working gases into the atmosphere. Accordingly, in closed systems the working gases must be cooled, cleaned and then recirculated through the system, eg. carbon monoxide - nitrogen systems.

Transverse convective gas dynamic laser systems described in the prior art which utilize an electrical discharge to excite the gaseous gain medium can be divided into two basic categories: (1) transverse electrical discharge systems and (2) supersonic plasma jet electrical discharge systems.

Transverse electrical discharge systems basically comprise an electrical discharge maintained between two or more electrodes oriented variously with respect to gas flow. The lasing optical cavity is oriented transversely with respect to gas flow, either within the discharge region or immediately downstream from the discharge region. U.S. Pat. No. 3,721,915 issued to J. P. Reilly entitled "Electrically Excited Flowing Gas Laser and Method of Operation" describes a typical transverse discharge laser system.

The general disadvantages of transverse electrical discharge convective laser systems are as follows:

1. spatially uniform electrical discharges are difficult to maintain in a flowing gas environment;

2. slight imperfections in the electrodes lead to arc formation and consequent kinetic heating of the gaseous medium;
3. an extremely high voltage must be expressed across the electrodes to maintain the discharge;
4. large flow rates of highly turbulent gas, with a consequent large pump power consumption, must be pumped through the discharge region to prevent arc formation.

Carbon dioxide - nitrogen convective laser systems have an additional disadvantage in that a large helium partial pressure in the working gas is required for discharge stability, temperature homogeneity and relaxation of the lower laser level, as well as other reasons. The helium component in the working gas induces pressure broadening of the gain coefficient, restricting it to low values. Further, the high cost of helium renders open cycle carbon dioxide -nitrogen convective gas laser systems impractical for most commercial applications.

Also, the power density of the gaseous gain medium in transverse electrical discharge systems generally is relatively low. Consequently, a relatively large number of mirror passes must be made across the optical cavity in order to extract significant power from the gain medium. Each mirror pass increases mirror losses, edge losses, and scattering losses.

Because of the foregoing disadvantages, transverse electrical discharge convective gas lasers have a relatively low overall efficiency and are not practical for most commercial applications.

Plasma jet electrical discharge laser systems described in the prior art utilize plasma jets which generate a gaseous plasma having a high kinetic or translational temperature as well as a high electronic or vibrational temperature. Specifically, the plasma jets described are arc plasma jets.

Typically, in the prior art plasma jet systems, the kinetic or translational temperature of the gaseous plasma is decreased by expending it through a supersonic expansion nozzle and a lasing optical cavity is oriented transversely across the supersonic expansion nozzle to extract the vibrational energy from the expanding gaseous plasma. A typical supersonic plasma jet electrical discharge gas laser system is described in U.S. Pat. No. 3,811,095 issued to J. W. Rich et al. entitled "Electrical-Discharge Excited Gaseous Laser".

The disadvantages of supersonic plasma jet laser systems described in the prior art relate to the requirement for a supersonic expansion of the gaseous medium for reducing the kinetic or translational energy of the medium. Such supersonic expansion requires high gas flow rates with consequent increase in pump power consumption and decrease in overall efficiency. Furthermore, it is very difficult to design a supersonic expansion nozzle which would be structurally compatible with an optical lasing cavity oriented perpendicularly to such a nozzle. Specifically, such nozzles must be very carefully designed to prevent the formation of shock waves which would tend to refract the laser beam. Any apertures in the nozzle would tend to generate such shock waves.

Finally, it is very difficult to introduce and uniformly mix a lasing gaseous species into a gaseous plasma flowing at supersonic velocities. Consequently, in the prior art systems, the lasing gaseous species must be introduced and uniformly mixed into the exciting gaseous plasma before it reaches the supersonic expansion nozzle. Accordingly, the lasing gas species gain a substantial amount of translation or kinetic energy which again decreases the specific power of the system.

Because of the foregoing disadvantages, plasma jet convective gas laser systems tend to have low gain coefficients (ca. 1/m), low efficiencies (ca. 1 percent) and have not been deemed practical.

SUMMARY OF THE INVENTION

The invented laser system is a transverse gas dynamic continuous wave system having a very large gain coefficient, a high specific power and high overall power efficiency. The system is compact in construction and requires relatively low gas flow rates. The invented system is adapted to operate as either an open or a closed system and is designed for commercial and industrial applications.

A particularly novel feature of the invented system is a non-equilibrium plasma glow jet which is designed to generate flowing gaseous species having high vibrational or electronic temperatures and low translational - rotational or kinetic temperatures. Specific novel features of the plasma glow jet relate to the design of a supersonic flow region, to the design of the choke section for inducing and damping shock waves in the flowing gaseous medium from the supersonic flow region creating high turbulent gas flow, and to the design of an expansion nozzle for reducing the gas flow from the choke section to subsonic velocities.

Another novel feature of the invented laser system relates to an injection method and apparatus for introducing and uniformly rapidly mixing a lasing gaseous species into an exciter gaseous species flowing from the expansion nozzle of the plasma glow jet.

Other novel features of the developed laser system relate to the particular design of the lasing optical cavity for extracting energy from the subsonically flowing gaseous gain medium. In particular, the optical cavity is long with respect to its gain region. Gas sweeps are established in the arms of the optical cavity on either side of the gain region for removing and cooling gaseous species which have a high kinetic temperature from the respective arms. The gas sweeps further minimize contamination of the reflective surfaces of the mirrors and also thermally isolate the mirrors from the gain region.

Still other novel features of the invented plasma glow jet laser system relate to the relative locations of the plasma glow jet, the injection and mixing apparatus and the optical cavity.

Moreover, the developed laser system has minimal voltage and current requirements. It is adapted for construction of materials with high thermal conductivity (metals) which maximizes wall cooling, a factor which decreases the translational (kinetic) energy of the gaseous gain medium and which allows external cooling of the system components.

A particular aspect of the invention, a nitrogen and carbon dioxide system, relates to an optimal gas mixture ratio of nitrogen and carbon dioxide for maximizing gain coefficients and hence specific powers.

Still further objects, advantages, and novel features of the invented plasma glow jet laser system will become apparent upon examination of the following detailed description of an illustrative embodiment of the invention together with the accompanying figures.

DESCRIPTION OF PREFERRED EMBODIMENT

The invented plasma glow jet laser system is initially described in context of a nitrogen-carbon dioxide system designed for operation at relatively low gas pressures (40 torr-100 torr). Then modifications of the basic system are discussed which would adapt the system for operation with other gaseous constituents, such as nitrogen-carbon monoxide, sulfur hexafluoride-hydrogen, helium-argon-krypton-neon, and metallic vapors. Subsequently, a modification of the basic system is discussed which would adapt the system for operation at atmospheric and higher pressures.

Figure 15:
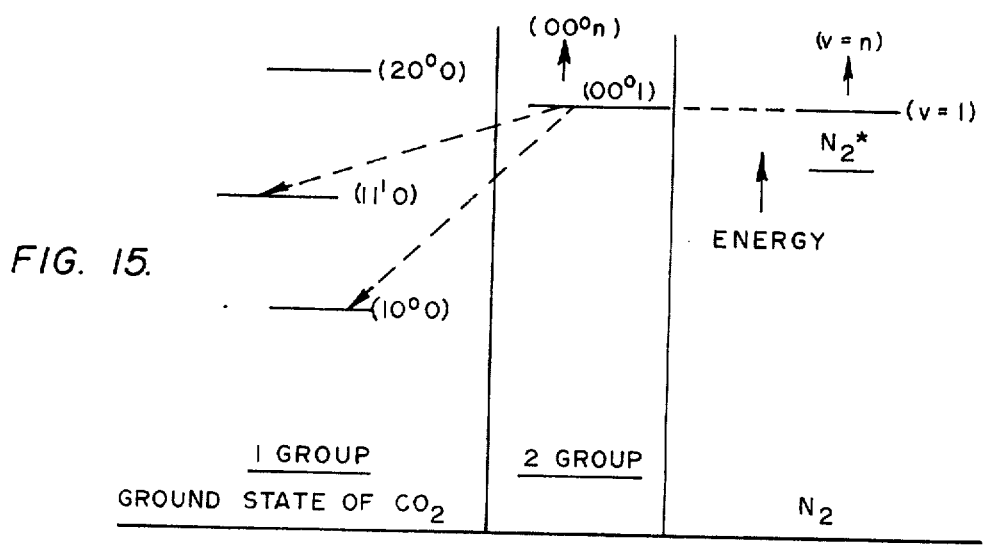
FIG. 15 shows the energy levels for a carbon dioxide-nitrogen laser.

Before proceeding with a detailed description, it is instructive to briefly review the kinetic mechanism of a nitrogen - carbon dioxide laser. FIG. 15 shows energy level diagrams for the carbon dioxide molecule and the nitrogen molecule. Basically, in the nitrogen - carbon dioxide laser, nitrogen gas molecules are vibrationally excited by some means into the excited state designated as $N_2^*$. A vibrationally excited nitrogen gas molecule then collisionally interacts with a carbon dioxide gas molecule, whereupon the vibrational energy is transferred to the carbon dioxide molecule, preferentially exciting it to the $00°1$ state, which is called the upper laser level. The vibrationally excited carbon dioxide molecule then encounters the radiation field produced by stimulated emission and is, upon contributing a photon to the field, deactivated to a lower vibrational energy state. Specifically, upon contributing the photon, the $CO_2$ is in the energy state $10°0$ within the group designated as one group (the lower laser level). For significant lasing action, a population inversion must exist between the upper laser level and the lower laser level of the carbon dioxide molecules. Specifically, there must be a significantly greater number of $CO_2$ molecules vibrationally excited in the $00°1$ level (upper laser level) than in the $10°0$ energy level (lower laser level). When the stimulated transition rate from the $00°1$ level to the $10°0$ level is greater than the transition rate from the one group ($10°0$ level) to the ground state, a "thermal bottleneck" develops, which throttles further lasing action, i.e. ends the population inversion. While the coupling between the lowest excited level of the $CO_2$ molecule and the ground state is strong, the transition rate therefrom does not exceed the transition rate between the upper laser level and that lower excited level in a strong stimulating radiation field. Further, the transition between the lowest excited level of the carbon dioxide molecule and its ground state generally increases the translational (kinetic) energy of the molecule which, in turn, increases the temperature of the gas. Helium, hydrogen or water vapor is added to increase the transition rate between the lowest excited level and the ground state. Specifically, the helium, hydrogen and water vapor have a high rate of relaxation for the lowest excited level of $CO_2$. Also, helium and hydrogen serve to transfer the translational (kinetic) energy of the $CO_2$ molecule to the walls of the lasing cavity. A detailed mathematical treatment of the nitrogen - carbon dioxide laser transitions is contained in the dissertation entitled *High Power Density Laser Excitation Mechanisms*, prepared by the inventor herein and submitted to the University of California, Davis, in partial satisfaction of the requirements for a doctorate degree in the Engineering - Applied Science Department.

Figure 1:
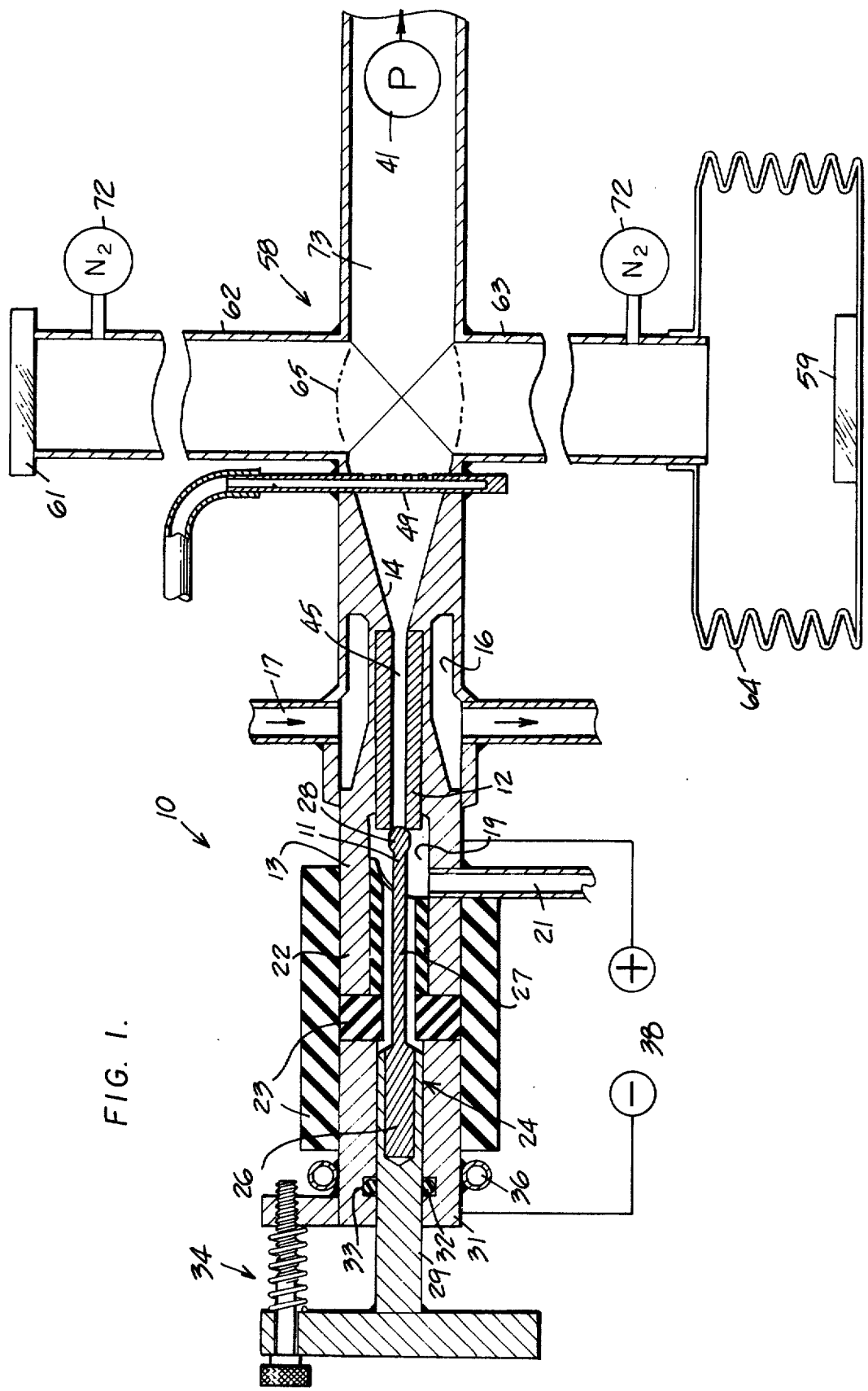
FIG. 1 is a cross-sectional drawing showing the basic configuration of a plasma glow jet laser system.

Referring now to FIG. 1, the basic plasma glow jet gas laser system includes a plasma jet 10 having a thoriated tungsten cathode 11, a hollow cylindrical molybdenum anode 12 extruded into a soft copper jacket 13. The plasma jet includes a copper expansion nozzle 14 integral with the copper jacket 13. The copper jacket 13 further includes a cooling annulus 16, through which a coolant such as water can be circulated, as indicated by the arrows 17.

Nitrogen gas is tangentially introduced into the cylindrical plenum 19 through the input port 21 so as to induce circular gas flow in the plenum 19. In more detail, the cylindrical plenum 19 is defined by a cylindrical wall 22 integral with the copper anode jacket 13, an annular ring of insulation 23 and the cathode base 24.

Figure 2:
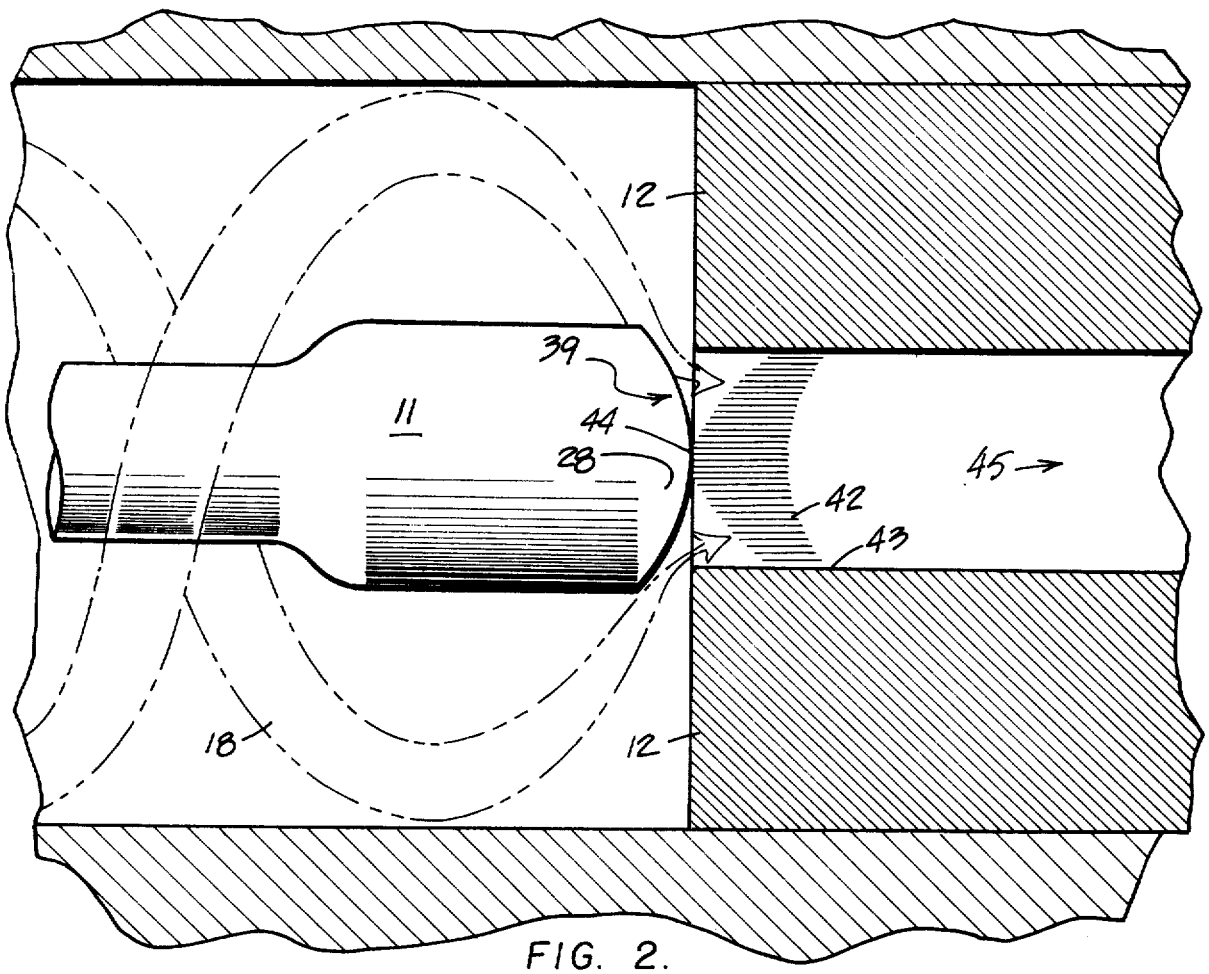
FIG. 2 is an enlarged cross-sectional line drawing showing the relative positions of the cathode, anode and the "anchored" electrical glow discharge.

In more detail, the thoriated tungsten cathode 11 comprises a base section 26, a central rod section 27 having a spherical end surface 28 with a greater diametric dimension than both the rod section 27 and the inner diameter of the annular molybdenum anode 12 (see FIG. 2). The base section 26 of the cathode is seated in a copper or brass push rod 29 adapted for translational movement within an annular sleeve 31 forming the cathode base 24. An "O" ring seal 32, received in a groove 33 cut into the cathode sleeve 31, establishes a vacuum seal between the cathode push rod 29 and the cathode sleeve 31. The cathode push rod 29 includes spring loaded adjustment means 34 for holding the translational position of the thoriated tungsten cathode 11 relative to the annular molybdenum anode 12. An annular coolant channel 36 is established around the outer diameter of the cathode sleeve 31 for cooling the cathode base section 26. The longitudinal axis of the thoriated tungsten cathode 11 is aligned with the longitudinal axis of the plenum 19 and the longitudinal axis of the annular molybdenum anode 12. An annular boron nitride insulative sleeve is disposed around the inside wall of the plenum 19 for electrically isolating the cylindrical wall 22 of the plenum 19 from the cathode rod section. A high efficiency saturable reactor controlled direct current power supply 38 is connected between the cathode base 24 and the proper anode jacket 13. The direct current power supply 38 is basically similar to that used in conventional direct current welding apparatus and has an open circuit voltage around 300 volts.

Referring now to FIG. 2, the nitrogen gas 18 exhausts from the cylindrical plenum 19 through an annular throat 39 defined between the spherical end surface 28 of the thoriated tungsten cathode 11 and the annular molybdenum anode 12. A pump 41, having a pump speed sufficient to establish supersonic gaseous flow for a cross-sectional flow area equal to that defined by the annular molybdenum anode, pumps the nitrogen gas 18 from the plenum 19. The circular flow motion induced in the plenum 19 establishes a stable supersonic flow vortex through the annular throat 39. Because of the high enthalpy of the nitrogen gas 18 streaming through the annular throat, it is necessary to bring the spherical end surface 28 of the cathode 11 into contact with the annular molybdenum anode 12 to start the discharge. The touching and consequent resistive heating between the cathode 11 and the anode 12 create a hot spot on the cathode which may have a temperature ranging between 2200°K and 3000°K. An electrical discharge emanates from the hot spot so created on the cathode 11 to the anode 12. Since touching the cathode surface 28 to the anode 12 can cause vaporization of low boiling point materials, the materials composing the electrodes should possess similar melting and boiling points. The same material should not be used for both electrodes because it would tend to stick excessively and cause material transfer between electrodes. Further, it is desirable to minimize electrode erosion so the cathode material should be chosen for high electron emissive properties at a temperature below its melting point. For these reasons, the thorium - tungsten cathode is preferred over a pure tungsten cathode. In addition, the anode should be composed of materials having a vaporization temperature substantially higher than the highest temperature expected on the cathode surface. For example, since the electron emission rate from the thoriated tungsten cathode is adequate at an operating temperature of approximately 2100°K, the anode must be composed of a material having a vaporization temperature substantially in excess of 2100°K. In the present invention, a molybdenum anode is suggested since molybdenum has a melting temperature of approximately 2800°K.

The above material parameters are established in order to minimize metallic content in the electrical discharge and to minimize erosion of the cathode 11 and anode 12.

As the spherical end surface 28 of the cathode 11 is moved out of contact with the annular molybdenum anode, the stable supersonic vortex flow of nitrogen gas through the annular throat 39 converts the electrical discharge between the cathode and anode into a stable glow discharge region 42, as indicated in FIG. 2.

As shown in FIG. 2, the glow discharge 42, stabilized by the supersonic vortex flow of nitrogen gas through the annular throat 39, is "anchored" between the inside cylindrical wall 43 of the annular molybdenum anode 12 and the central region 44 of the spherical end surface 28 of the cathode 11. Accordingly, the glow discharge is highly symmetrical around the common, central, longitudinal axis of both the annular throat 39 and the annular cathode 12. Since the nitrogen gas is streaming through the electrical glow discharge region 42 at supersonic velocities, elastic collisions between the electrons of the discharge and nitrogen molecules are minimized, thereby minimizing translational heating of the nitrogen gas. However, the streaming nitrogen molecules remain in the electrical discharge for a sufficient period of time to be vibrationally excited into the $N_2$* vibrational state. Furthermore, the glow discharge has a sufficient power density for ionizing the $N_2$ molecules so that a plasma, as well as excited nitrogen gaseous species, emerges from the discharge region. Basically, the high power density electrical glow discharge region 42 converts the supersonically flowing nitrogen gas into a supersonically flowing plasma and excited nitrogen gaseous species. The medium emerging from the discharge region is commonly referred to as "activated nitrogen". Since the nitrogen molecules gain minimal translational (kinetic) energy from the electrical discharge region 42, the collisional lifetime of the activated nitrogen is long (many seconds).

Figure 3:
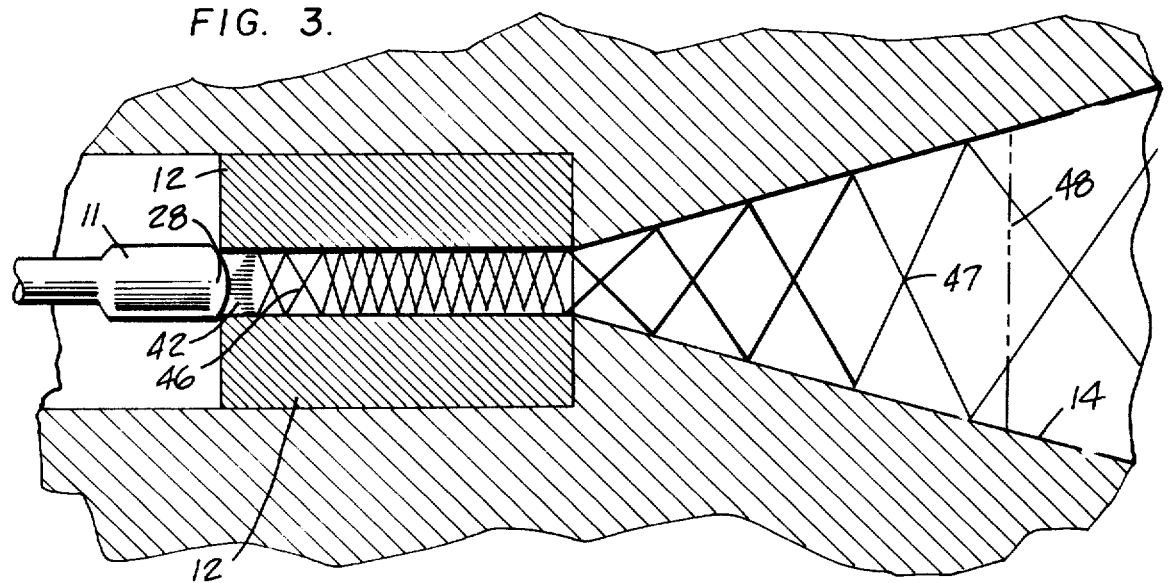
FIG. 3 is a cross-sectional line drawing of the choke and expansion nozzle of the plasma jet showing propagation of shock waves therein.

Beyond the discharge region 42, the annular molybdenum anode functions as a choke tube 45. Specifically, referring to FIG. 3, the cross-sectional area of the annular anode 12 is sufficiently larger than the throat to cause over-expanded flow and choking of the plasma and excited nitrogen gaseous species flowing from the glow discharge region 42. Accordingly, shock waves 46 are created in the supersonically flowing plasma and excited nitrogen gaseous species, as shown in FIG. 3. The length of the choke section 45 of the annular anode 12 is chosen so as to attenuate the shock waves induced in the supersonically flowing medium. One purpose for inducing shock waves in the supersonically flowing plasma and excited nitrogen gas species is to induce turbulent flow to enhance mixing of carbon dioxide into the streaming plasma and excited nitrogen gas species, as will be described infra.

The activated nitrogen medium flows from the choke region of the annular cathode 12 into the expansion nozzle 14. The expansion nozzle 14 increases the cross-sectional flow area out of the plasma jet 10 to a point beyond which supersonic flow can be sustained. At the point in the expansion nozzle where supersonic flow of the plasma and excited nitrogen gas species becomes subsonic, further shock waves 47 are induced in the flowing medium. (See FIG. 3). The actual extent to which the expansion nozzle 14 must increase the cross-sectional flow area is largely determined by the pumping rate exhausting the gas from the system.

Figure 4:
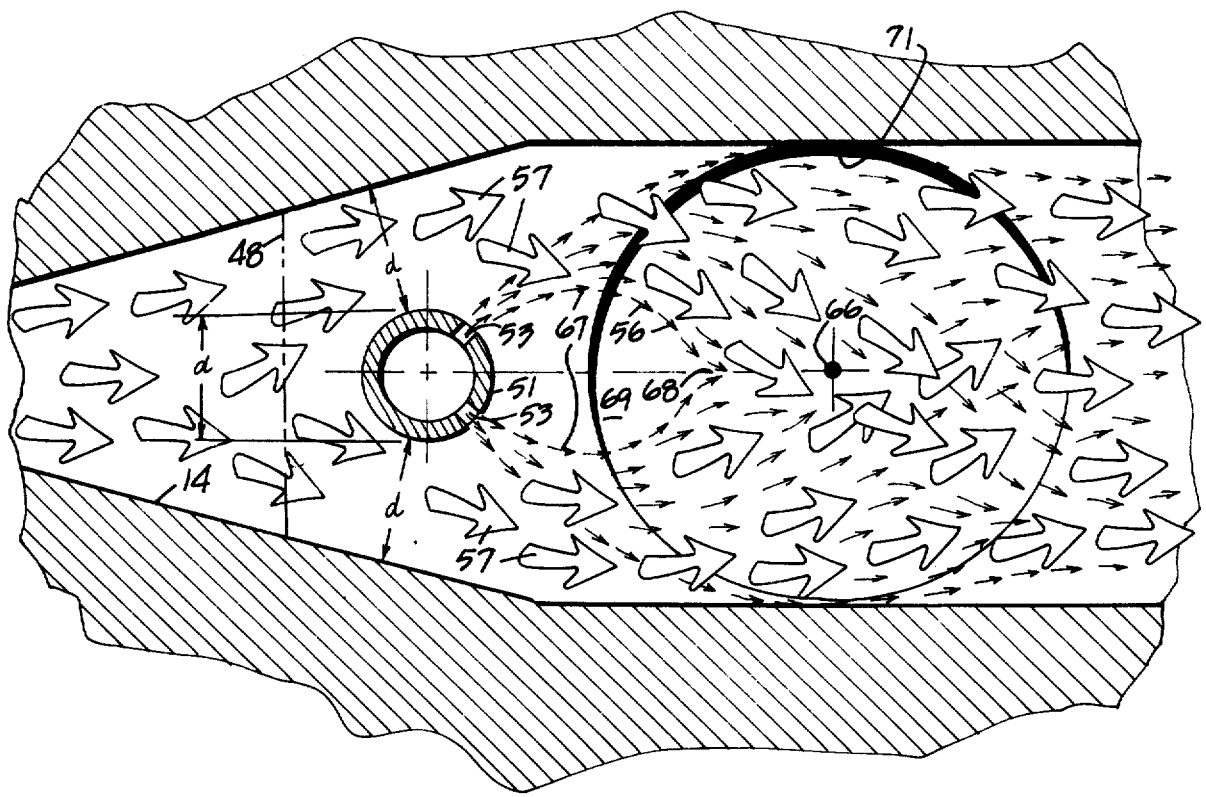
FIG. 4 is an enlarged cross-sectional line drawing showing the injection and mixing region and the relative location of the gain region.

Referring now to FIGS. 1 and 4, a mixing bar 49 connected to a source of carbon dioxide gas introduces the $CO_2$ gas into the subsonically flowing plasma and excited nitrogen gaseous species in the subsonic flow region 48 of the expansion nozzle 14.

The mixing bar 49 basically comprises a tube 51 having a circular cross section with an outside diameter D approximately equal to the maximum normal distance between the inside surface of the expansion nozzle 14 and the outside surface of the tube 51. Specifically, the tube is oriented perpendicularly with respect to the direction of flow of plasma and excited nitrogen gaseous species across the center 52 of the expansion nozzle 14. The mixing bar 49 has a plurality of ports 53 aligned in two rows along the downstream face 54 of the tube 51. Each row of ports 53 is adapted to inject carbon dioxide gas angularly into each stream of plasma and excited nitrogen gas species 57 moving around each side of the mixing tube 51.

If a single mixing tube is utilized for injecting carbon dioxide 56 into the streaming plasma and excited nitrogen gaseous species 57, the ports 53 should be oriented into rows 45° above and 45° below the horizontal plane in which the mixing tube 51 lies. However, carbon dioxide can be injected into the plasma and excited nitrogen gas species flow by more than one mixing tube 49. In such cases, it may be desirable to orient the ports differently than that orientation shown in FIG. 4 of this description.

Specifically, it is desired to disperse the carbon dioxide uniformly into the plasma and excited nitrogen gas species so as to maximize mixing. Vibrational excitation of the carbon dioxide 56 by the excited nitrogen gas species creates a population inversion between the upper and lower laser levels of the carbon dioxide molecule as hereinbefore described. A small amount of hydrogen is added to the carbon dioxide to remove the thermal bottleneck which would throttle stimulated emission from the excited carbon dioxide.

As shown in FIGS. 1 and 4, the lasing optical cavity 58 is oriented perpendicularly across the downstream end of the expansion nozzle 14 immediately downstream from the mixing tube 49. The optical cavity includes 2 reflective surfaces 59 and 61 mounted at the end of two oppositely extending axially aligned arms 62 and 63. More particularly, as shown in FIG. 1, the mirror 59 is mounted into a bellows structure 64 which, in turn, is secured to the arm 63. The bellows structure 64 allows for adjustment of the mirror 59. The mirror 61 partially transmits the stimulated emission radiation from the vibrationally excited carbon dioxide molecules.

The axis of the optical cavity 58 is oriented parallel to the mixing tube 51, a factor which tends to minimize scattering and refractive losses in the optical cavity.

The described optical cavity 58 has an active region 65 having a length equal to the diametric dimension of the expansion nozzle and a height and width determined by the flow area required to prevent collisional deactivation in the cavity. As shown in FIG. 4, the central optical axis 66 of the optical cavity should be located a specific distance from the point of introduction of carbon dioxide. In particular, two plumes 67 of carbon dioxide flow from the ports 53 and mix with the streams of plasma and excited nitrogen gaseous species 57 flowing on either side of the mixing tube 51. The central optical axis 66 of the lasing cavity should be located just beyond the point of confluence 68 of the respective plumes 67.

Basically, as shown in FIG. 4, the tube 51 creates a tear-shaped eddy 69 in the subsonically flowing plasma and excited nitrogen gaseous species emerging from the expansion nozzle. Very little mixing of carbon dioxide and excited nitrogen occurs in the tear-shaped eddy 69. Accordingly, optical gain in the leading edge of the active region is held down, a factor which prevents diffraction losses at the upstream cavity edge. However, the actual volume of the eddy 69 should be minimized because slow mixing tends to spread the excitation over a larger length and, for that reason, lowers the gain coefficient. Accordingly, turbulence generated in the flowing plasma and excited nitrogen gaseous species by the upstream shock system combines with the turbulence induced by the mixing tube 51 to minimize the volume of the eddy region 69. The cross-sectional illustration of FIG. 4 shows the optical cavity 71 in relationship to the $CO_2$ plumes 67 and the eddy 69. The actual width of the cavity 71 (measured in the direction of flow) is determined by the rate at which vibrational energy is removed from the excited carbon dioxide gas and the length required for complete mixing.

Figure 5:
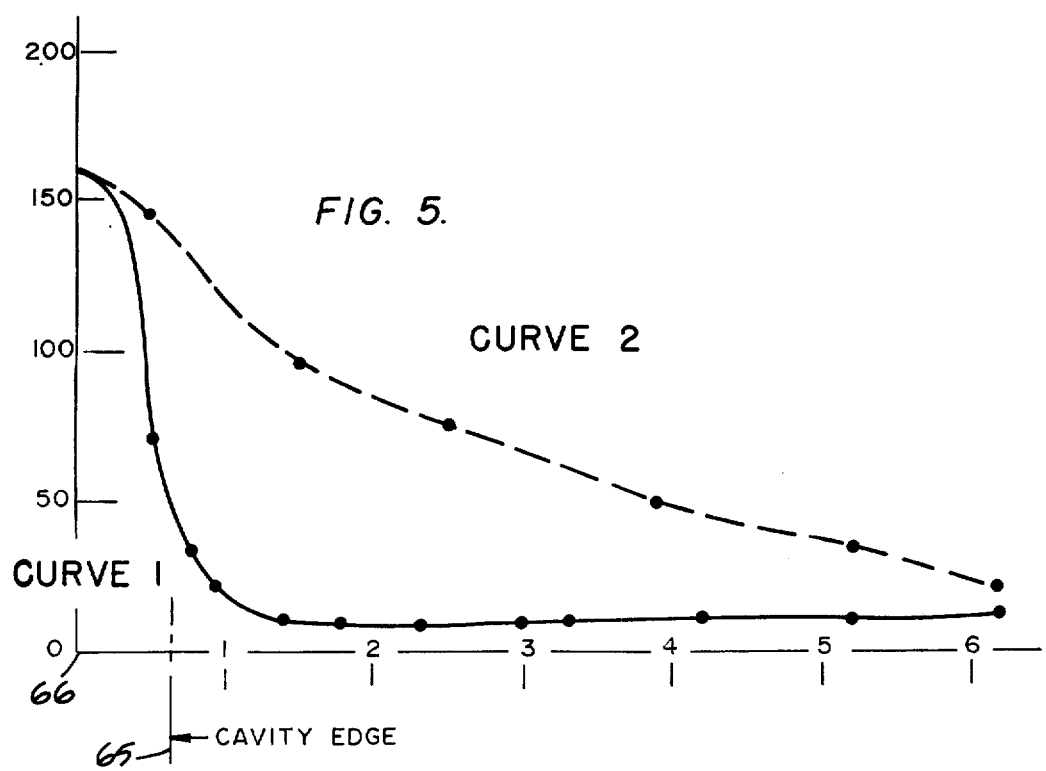
FIG. 5 is a graph showing the gas temperature in the arms of the optical cavity with a gas sweep (curve 1) and without a gas sweep (curve 2).
Figure 7:
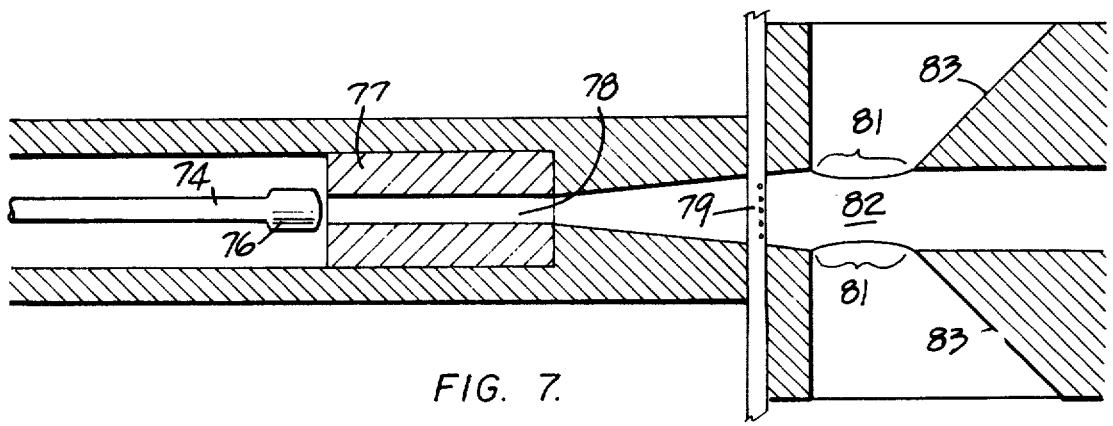
FIG. 7 is a schematic plan view of FIG. 6.
Figure 6:
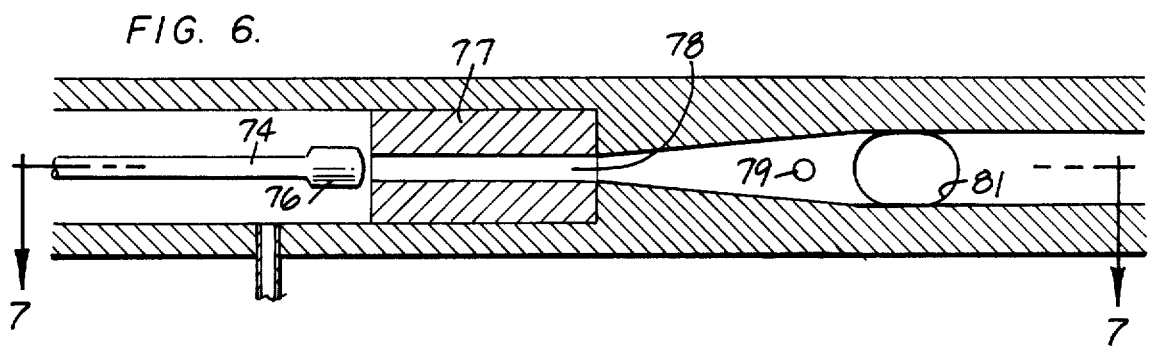
FIG. 6 is a schematic cross-section representative of a high pressure plasma glow jet laser system.

Referring now to FIGS. 1 and 5, two gas leaks 72 are established in the arms 62 and 63 of the optical cavity near the mirrors 59 and 61. Specifically, room temperature nitrogen gas is injected into the arms 62 and 63 of the optical cavity 58 for cooling and for sweeping high kinetic temperature carbon dioxide from the optical cavity. In particular, deactivated carbon dioxide diffuses from the active region 65 into the respective arms of the optical cavity. The deactivated carbon dioxide has a high kinetic temperature which thermally excites the lower laser level which consequently begins to absorb radiation from the active volume. Eventually, the absorption by the deactivated carbon dioxide would stop lasing action.

The effect of the cooling gas sweeps is shown by the graph of FIG. 5. In FIG. 5, gas temperature (kinetic temperature) is plotted as a function of distance measured from the central point 66 of the active region along the longitudinal axis of the laser arm. Curve 1 shows gas temperature without the cool-gas sweeps. Curve 2 shows the gas temperature with the cooling gas sweeps. Basically, curves 1 and 2 indicate the distribution of thermally excited carbon dioxide along the respective lengths of the optical cavity arms with and without the cooling gas sweeps, respectively. As shown by curve 1, the gas leaks 72 essentially eliminate thermally excited carbon dioxide from all regions of the optical cavity except at the downstream edge of the active region. There thermally excited carbon dioxide is drawn immediately from the active region by the pump 41.

The most critical points in the design and construction of the described laser system are the inside diameter of the anode and the shape of the cathode. Specifically the cathode must be shaped so as to minimize stagnation regions near the discharge. Furthermore, it is very important that the cathode be accurately centered along the axis of the anode 12.

TABLE 1.

TABLE OF GAIN COEFFICIENTS
Pump speed - 13 liters/sec    Mixing length - 8 mm
Gain coefficient - at the point of complete mixing
Pressures in torr

| $P_{N_2}$ | $P_{CO_2}$ | $P_{H_2}$ | Gain Coefficient (/m) | Velocity (cm/sec) | Flow Area (cm$^2$) |
|---|---|---|---|---|---|
| 40 | 10 | 0 | 28.0 | 9600 | 1.35 |
| 40 | 20 | 0 | 41.0 | 9600 | 1.35 |
| 40 | 25 | 0 | 44.1 | 9600 | 1.35 |
| 40 | 10 | 0 | 27.0 | 7200 | 1.81 |
| 40 | 20 | 0 | 38.5 | 7200 | 1.81 |
| 40 | 25 | 0 | 40.9 | 7200 | 1.81 |
| 40 | 10 | 0 | 26.0 | 5760 | 2.26 |
| 40 | 20 | 0 | 36.2 | 5760 | 2.26 |
| 40 | 25 | 0 | 38.0 | 5760 | 2.26 |
| 40 | 10 | 0 | 24.2 | 4120 | 3.16 |
| 40 | 20 | 0 | 32.3 | 4120 | 3.16 |
| 40 | 10 | 1 | 24.3 | 4800 | 2.7 |
| 40 | 20 | 1 | 29.7 | 4800 | 2.7 |

The cathode also should be carefully shielded from the copper body of the anode to prevent arcing and electrode destruction. Also, air leaks into the discharge region should be eliminated to prevent oxidation of the electrodes. It is also very important that a good thermal contact be established between the copper jacket 13 and the annular molybdenum anode such that thermal power deposited by the electrical discharge in the anode (anode fall power) can be removed. A particular technique for insuring good thermal contact between the jacket 13 and the anode 12 is to extrude an annular molybdenum anode into a receptacle drilled into the copper jacket having a diameter slightly less than the outside diameter of the annular anode (diameter difference equals 0.025 mm).

Another critical feature of the described laser system relates to the plasma jet defined by the spherical and surface 28 of the cathode 11 and the annular molybdenum anode 12. In particular, the plasma jet is a "non-equilibrium" plasma jet, which means that the kinetic temperature and the vibrational or electronic temperatures of the gaseous species emerging from the electrical glow discharge region 42 are not in equilibrium, but rather have high vibrational or electronic temperatures relative to their kinetic temperatures.

Finally, a heat exchanger would be positioned between the cavity and the pump for cooling the gases before circulating them through the pump.

Table I shows the gain coefficient obtained from the invented carbon dioxide-nitrogen gas plasma glow jet laser.

A CARBON MONOXIDE - NITROGEN PLASMA GLOW JET LASER SYSTEM

The laser system shown in FIG. 1 can be adapted for operation with carbon monoxide. Specifically, in a carbon monoxide system, the carbon monixide can be introduced into the system with the nitrogen via the port 18 into the plenum 19 and exhausted supersonically therefrom through the annular throat 39 and the glow discharge region 42 to create plasma and excited gaseous species of both nitrogen and carbon monoxide having high vibrational temperatures and low translational or kinetic temperatures (hereinafter referred to as the excited gaseous medium). The shock waves are induced and damped or attenuated by the tube section of the annular anode 12 to enhance turbulent flow in the excited gaseous medium. The excited gaseous medium emerges from the tube section of the anode 12 into the expansion nozzle and shocks to subsonic flow. The mixing tube 51 can be eliminated. The lasing optical cavity 58 defined between the mirrors 59 and 61 then extracts the vibrational energy stored in the excited gaseous medium by stimulated emission. The pump 41 is connected by an exhaust port axially aligned with the longitudinal axis of the expansion nozzle 14 to exhaust the de-excited lasing species from the active region 65 of the optical cavity.

In more detail, in both the carbon dioxide and carbon monoxide systems an exhaust port 73 from the laser system is fluidically coupled to the expansion nozzle so as to minimize diffusion and scattering of the excited gain medium from the active region of the optical cavity.

Alternatively, a carbon monoxide - nitrogen system could be operated in exactly the same fashion as the carbon dioxide - nitrogen system hereinbefore described with the carbon monoxide being injected and mixed into the active nitrogen medium by the mixing tube 51.

A pre-mixed carbon monoxide-nitrogen system has a slight disadvantage in that the highest value of gain is obtained along the leading or upstream edge of the active region which increases diffraction losses and damages mirrors with a consequent loss in laser beam power.. The primary advantage of operating a pre-mixed carbon monoxide - nitrogen plasma glow jet laser system is that it can be operated as a closed system. Specifically, the gases exhausted from the active region can be cooled and recycled back through the system. In fact, cooling the nitrogen and carbon monoxide gases to approximately liquid nitrogen temperature prior to cycling them through the plasma glow jet system is thought to enhance the output of the laser in that such cooling greatly decreases the translational or kinetic temperature of the gaseous medium.

A PLASMA GLOW JET HYDROGEN FLUORIDE CHEMICAL LASER SYSTEM

Figure 10:
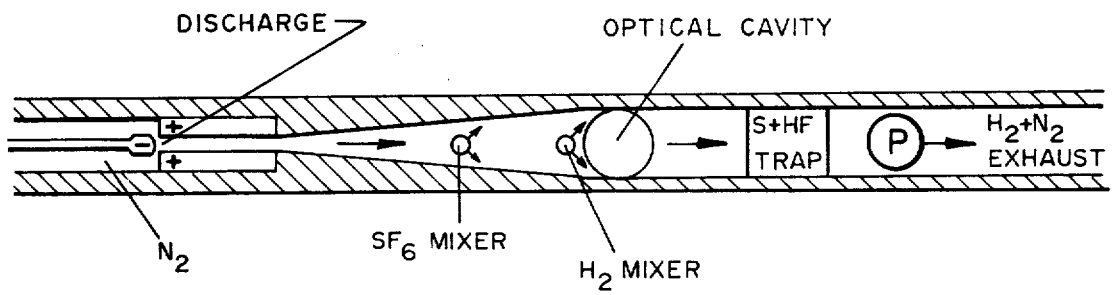
FIG. 10 is a schematic representation of a Hydrogen Fluoride plasma glow jet chemical laser system.
Figure 11:
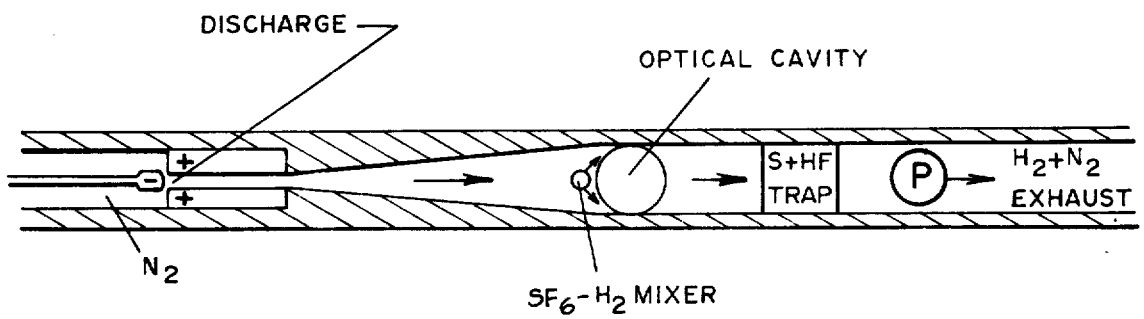
FIG. 11 is a schematic representation of another Hydrogen Fluoride plasma glow jet chemical laser system.

The basic plasma glow jet laser system described in FIG. 1 is also suitable for generating a continuous wave laser beam from hydrogen fluoride. Specifically, the plasma flow jet is utilized to produce non-equilibrium plasma and excited nitrogen gaseous species. Gaseous sulfur hexafluoride (binding heat of 262 kcal/mole) is mixed into the plasma and excited nitrogen gaseous species which supply energy for disassociating the sulfur and the fluorine (44 kcal/mole F). Hydrogen gas may be injected with the sulfur hexafluoride gas as per the schematic shown in FIG. 11. Alternatively, hydrogen gas or a hydrogen rich gas can be injected into the flowing stream of plasma, excited nitrogen gaseous species, and disassociated sulfur and fluorine species downstream from the injection of the gaseous sulfur hexafluoride as shown in the schematic of FIG. 10.

The fluorine atoms react with the hydrogen gas to form hydrogen fluoride releasing 31.7 kcal/mole, a highly energetic chemical reaction. The energy released by the chemical reaction is primarily deposited in the vibrational energy states of the hydrogen fluoride molecule. The hydrogen fluoride molecule has a lasing transition between the second vibrational energy level and the first vibrational energy level having a wavelength of around 2.8 microns. Also the plasma and excited nitrogen gaseous species have very little translational or kinetic energy and very little translational or kinetic energy is transferred to the hydrogen fluoride molecule, resulting in high operating efficiency.

However, vibrational energy in the hydrogen fluoride molecule decays very rapidly into translational or thermal energy. Accordingly, the basic configuration of the plasma glow jet laser system as shown in FIG. 1 would have to be modified to allow a flow velocity in the expansion nozzle 14 and the mixing region at near supersonic velocities. Furthermore, the hydrogen and sulfur hexafluoride must be mixed into the flowing plasma and excited nitrogen gaseous species within the optical cavity. Further, the operating pressure should be kept low (between 3 to 10 torr) to avoid excessive collisional relaxation of the lasing vibrational energy state of the hydrogen fluoride gain medium.

Figure 12:
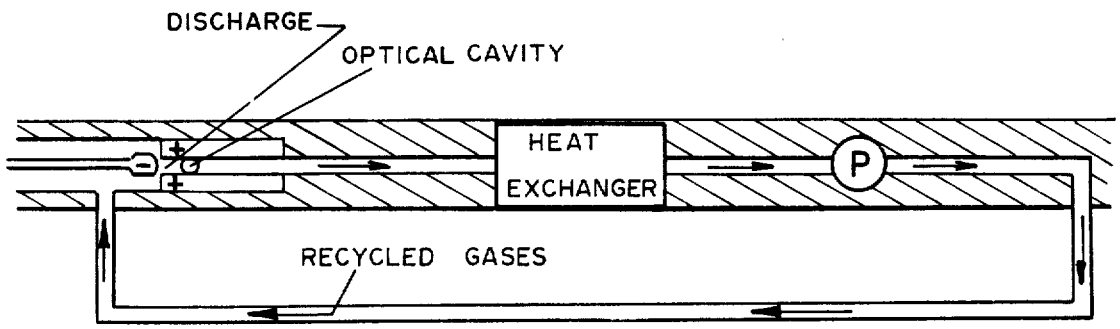
FIG. 12 is a schematic representation of a Noble gas plasma glow jet laser system.

Finally, the basic plasma glow jet laser system should be modified such that the components of the system in the vicinity of the hydrogen fluorine reaction are impervious to fluorine. For example, the components in the vicinity of the reaction region can be coated with fluorocarbons such as teflon. The gas sweeps established in the arms of the optical cavity would be adequate to isolate the reflective mirror surfaces from contamination by the fluorine. In addition, in the hydrogen fluoride laser system shown in the schematic of FIG. 11, care should be taken to prevent undue erosion of the hydrogen gas injector. As shown schematically in FIGS. 11 and 12 the hydrogen fluoride chemical laser system should include a sulfur and hydrogen fluoride trap upstream from the pump leaving primarily hydrogen and nitrogen as the exhaust gas.

The primary advantage of the plasma glow jet hydrogen fluoride chemical laser system is that the large discharge specific power (1000 kw/lb. mass/sec) of the plasma jet is placed selectively into the vibrational and electronic energy states of the nitrogen gas, and the vibrational and electronic energy transfer between the sulfur hexafluoride and nitrogen gas is highly efficient when compared with a thermal interaction between nitrogen and sulfur hexafluoride. Accordingly, high gain coefficients can be obtained at relatively low pressures and with a high concentration of excited lasing states.

PLASMA GLOW JET LASER EXCITATION IN THE VISIBLE OR ULTRAVIOLET REGIONS

The carbon dioxide - nitrogen glow jet laser system depends for its operation on the metastable nature of vibrationally excited nitrogen. Specifically, the metastable energy level of vibrationally excited nitrogen has a long lifetime (minimal collisional deactivation) and can be used to store and transport vibrational energy. Electronic energy states analogous to the metastable vibrational energy state of nitrogen are the metastable energy levels in helium, $He(2^3S_1)$ and $He(2^1S_0)$. The identified metastable energy states of helium have an energy of approximately 20 eV above the ground state. The identified helium metastable states have a very low rate of radiative decay. They also have a relatively large cross-section for production. However, the rate of collisional loss increases with the square of the concentration of the metastable levels in helium gas. More particularly, the collisional loss rate is governed by an equilibrium reaction as follows:

In a region having a high electron density and having a high concentration of helium in the ground state the equilibrium reaction is driven away from metastable loss toward production of helium in the desired metastable energy states. Such an environment exists in a non-equilibrium plasma glow jet. Also the electron - iron recombination coefficient in helium is small. Accordingly, the electrons and ions in the helium excited by the plasma glow jet have relatively long lifetimes a factor which also tends to drive the equilibrium reaction in favor of the desired metastable energy states.

Accordingly, a plasma glow jet can be utilized to excite a relatively high concentration of metastable energy states in helium gas. The energy stored in the metastable helium energy states can be used to excite such materials as cadmium, selenium, mercury, as well as neon, krypton, xenon and argon, all of which have suitable lasting energy transitions.

Figure 13:
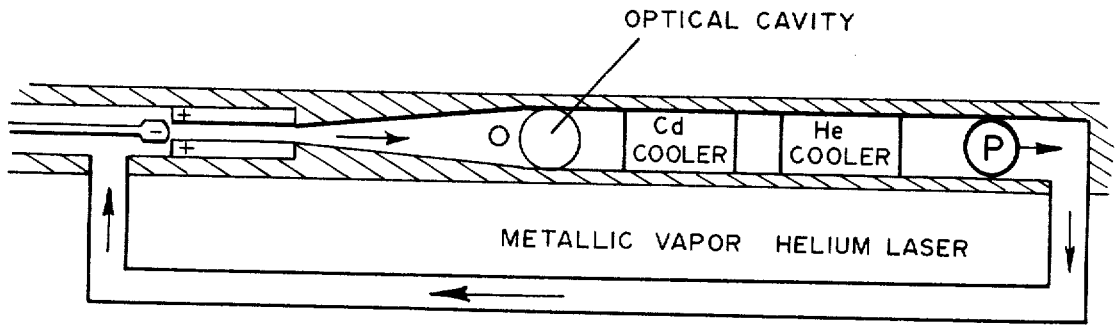
FIG. 13 is a schematic representation of a helium-metallic vapor plasma glow jet laser system.
Figure 14:
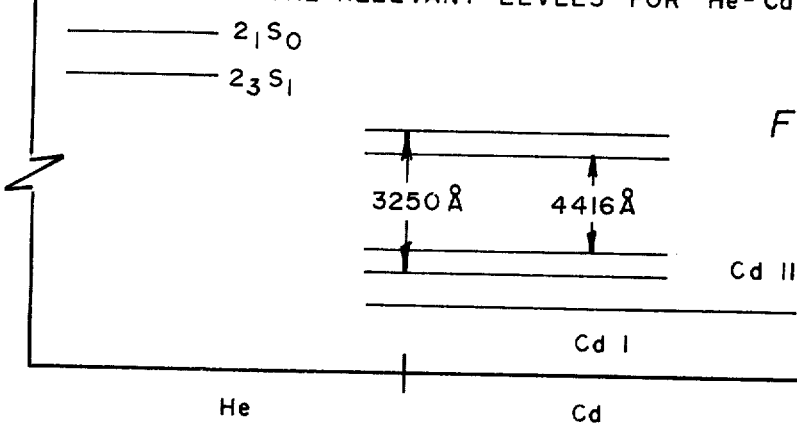
FIG. 14 shows the element energy levels for He-Cv laser.

FIG. 13 schematically shows a plasma glow jet laser system for metallic vapor lasing species utilizing helium gas. Referring to the figure, helium gas is excited into the desired metastable electronic energy states by a plasma jet having a configuration identical to that shown and described in FIG. 1. The excited helium gas flows from the glow discharge region 42 at supersonic velocity, exits from the tube section of the annular anode 12 into the expansion nozzle 14 where it shocks to subsonic velocity. Metallic atoms, for example, selenium, cadmium, or mercury, are injected into the subsonically flowing excited helium as it emerges from the expansion nozzle. An optical cavity 58 is oriented transversely across the flowing gas stream immediately downstream from the injector 49. A suitable injector for mixing metallic atoms into the flow stream of the excited helium would be a porous wire impregnated with, for example, cadmium, selenium or mercury. The plasma and excited helium levels heat the wire and vaporize the cadmium, selenium or mercury it contains. If additional energy is required for vaporizing the cadmium, selenium or mercury a suitable electrical circuit can be connected to the respective ends of the wire for heating the wire. Alternatively, the cadmium, selenium, or mercury could be vaporized and the metallic vapor introduced into the flowing plasma and excited helium stream in the same manner that carbon dioxide is introduced into the plasma and excited nitrogen gaseous species.

The helium and metallic vapor exhaust from the active region of the optical cavity and are circulated through a metallic vapor trap and a cooler to reduce the temperature of helium whereupon the helium is recycled by the pump back to the plasma jet.

FIG. 4 shows the relevant levels for a helium - cadmium plasma glow jet laser system.

FIG. 2 schematically shows a plasma glow jet laser system utilizing helium and a noble gas lasing species such as argon, neon, krypton, or xenon. In the noble gas plasma glow jet laser system the gases are premixed with helium being the dominant constituent. The high helium content of the working gas results in an efficient excitation because most of the energy transferred to the working gases from the glow discharge region goes into the metastable energy states of helium and then via the Penning reaction directly to the lasing transition excited states of for example, neon gas or argon ions. Since the spontaneous emission rate is high from the lasing species the optical cavity is located immediately downstream from the glow discharge region eliminating the necessity for a tube for inducing and damping shock waves and the necessity for an expansion nozzle. The working gases are then cycled through a heat exchanger and then recycled back to the plasma glow jet.

The primary advantage of the plasma glow jet noble gas laser system is that the non-equilibrium plasma glow jet has an extremely high power density which preferentially and efficiently excites the electronic energy states in the noble gas atomic or ionic species. Hence, highly efficient noble gas lasers can be pumped by the plasma glow jet at pressures ranging from 1 torr to atmospheric pressure. Further such plasma glow jet noble gas lasers of the type schematically shown in FIG. 12 have an extremely high gain coefficient which allows small active regions for producing continuous wave laser beams having power levels greatly in excess of those from conventional noble gas laser systems.

HIGH PRESSURE CARBON DIOXIDE AND CARBON MONOXIDE PLASMA GLOW JET LASER SYSTEMS

The non-equilibrium plasma glow jet configuration defined by the spherical and surface of the cathode and the cylindrical orifice defined by the annular anode is also suited for efficiently lasing transitions in carbon dioxide and carbon monoxide at near atmospheric pressures. However, the relaxation rate of the upper lasing level in such gaseous species due to collisional interaction is increased with increasing pressure.

FIGS. 6, 7, 8 and 9 schematically show a high pressure carbon dioxide system. The basic configuration of the plasma glow jet remains identical with a cathode 74 having a spherical end surface 76 and an annular anode 77 for defining the cylindrical orifice. A stable supersonic flow vortex is established through the annular throat defined between the cathode 74 and cylindrical orifice. The gaseous medium is nitrogen. Again, a stable glow discharge is established in the downstream region of the cylindrical orifice and anchored to the cylindrical walls of the orifice and to the center of the spherical surface 76 of the cathode. The glow discharge region excites the nitrogen gas into the plasma and gaseous species which then flow axially down a chamber 78 having a slightly increasing cross-sectional area. Specifically, the cross-sectional area of the chamber increases so as to minimize shock wave formation within its volume. A mixing bar 79 is disposed centrally across the end of the chamber 78. An optical cavity 81 is provided immediately downstream from the mixing bar with its axis oriented parallel to the axis of the mixing bar 79. The mixing bar is shaped so as to minimize formation of shock waves 80 oriented obliquely with respect to the optic axis of the optical cavity. To further minimize shock wave degradation of the optical properties within the active region 82 of the optical cavity, baffles 83 are created on the downstream of the cavity inclined so as to prevent shock waves from forming in the optical cavity. The baffles also serve to spill the de-excited gas from the optical cavity.

The active species are driven through the high pressure plasma glow jet laser system by gas pressurization upstream rather than by pumping at the downstream end. The pressure at the upstream end must be sufficient to force the working gas, nitrogen, through the system near sonic or just above sonic velocities and into the active region 82 of the optical cavity which exists at atmospheric pressure absent gas flow into the cavity 81. In order to minimize the probability of a sonic shock wave appearing upstream in the system, the cross-sectional flow area must be relatively small. Accordingly, the active region in the optical cavity is small. However, since the non-equilibrium plasma glow jet is capable of creating excited gaseous species having an extremely large vibrational energy content, the active region will have an extremely high gain coefficient. Accordingly, it is possible to obtain laser beams having a relatively high power flux.

Figure 8:
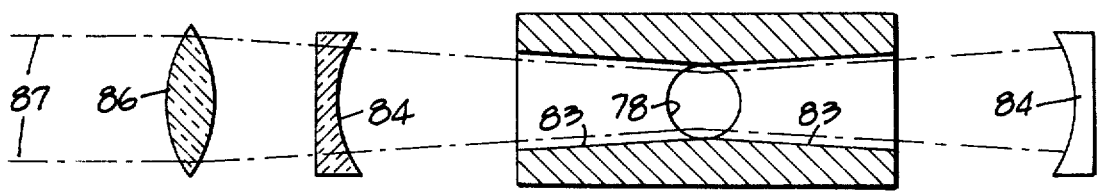
FIG. 8 is a schematic cross-section representation taken along the optical axis of the laser system (along view 8—8 of FIG. 9).

Referring now to FIG. 8, the mirrors 84 defining the optical cavity may have a large angular divergence with a focal region within the active region. This allows the energy flux of the stimulated laser beam to be dispersed over a large surface area of the mirrors thereby minimizing the probability of mirror damage. Additional optical elements 86 placed outside the optical cavity can be utilized to collimate the beam 87 emerging from the transmitting mirror surface.

Figure 9:
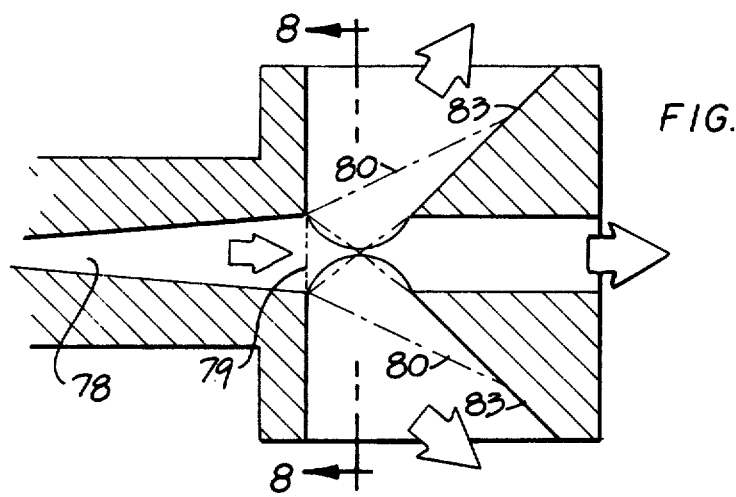
FIG. 9 is a schematic cross-section representation of a high pressure plasma glow jet laser showing the position of shock waves in the optical cavity.

Referring now to FIG. 9, schematically showing a high pressure carbon monoxide plasma glow jet laser system, the working gas is a mixture of nitrogen and carbon monoxide. The working gas from a high pressure container is cooled to liquid nitrogen temperatures then circulated through the system. Because the collisional relaxation decay time of the upper lasing energy state of carbon monoxide is long relative to that of carbon dioxide, it is possible to operate this system at subsonic velocity. A subsonic velocity system is preferred since in such a system there would be no shock waves which would degrade the optical properties of the active region. Since carbon monoxide is a poisonous gaseous medium, the high pressure carbon monoxide system should include means for collecting the gases exhausting from the active region. Such means could include a large cross-section exhaust duct driven by a conventional blower.

Alternatively, high temperature window materials can be utilized to confine the flow of the gaseous mediums across the optical cavity and eliminate oblique shock waves. In systems utilizing windows to confine the flow across the optical cavity, all contaminants which would tend to coat such surfaces must be removed from the working gases. Specifically, no oil or other such contaminant can be introduced into the system. Finally, such high temperature window material must be capable of transmitting a high power flux laser beam with minimum distortion and dispersion.

A PULSE OR CONTINUOUS WAVE AMPLIFYING PLASMA GLOW JET LASER SYSTEM

The described plasma glow jet laser systems can be modified for amplifying a pulse of stimulating radiation. Specifically, a plurality of plasma glow jet systems can be utilized to create a plurality of active regions along an optical axis. Each of the active regions so provided are isolated from each other by a gas sweep established between the regions. The gas sweeps both cool and sweep out deactivated gaseous species having high kinetic temperatures. Accordingly, absorption between the active regions can be kept at minimum levels. In addition, a series of aligned active regions produced by a plurality of plasma glow jets can be operated as a continuous wave amplifying system. Specifically, a continuous wave oscillator optical cavity can be established across one of the active regions while the remainder of the active regions amplify the continuous wave output from the oscillating cavity.

While the invented plasma glow jet laser system is described with respect to exemplary, representative and schematic embodiments, it should be apparent that numerous variations and modifications can be effected within the spirit and the scope of the invention as described herein and above and as defined and set forth in the appended claims.

I claim:

1. A high power density laser comprising in combination,
   a. a gaseous medium,
   b. means for inducing axially symmetrical supersonic flow of said gaseous medium,
   c. means for establishing an electrical glow discharge having axial symmetry across said supersonic flow for converting said gaseous medium into supersonically flowing plasma and excited gaseous species having low translational temperatures and a population inversion therein, and,
   d. means for stimulating the emission of radiation energy from said flowing plasma and excited gaseous species for producing a laser beam.

2. The laser of claim 1 wherein said means for inducing axially symmetric supersonic flow of said gaseous medium comprises in combination,
   a. a source of said gaseous medium,
   b. a structure defining an annular throat in communication with said source, and
   c. means for pumping the gaseous medium from said source through said throat at supersonic velocities.

3. The laser of claim 2 wherein said source of gaseous medium comprises a cylindrical plenum axially aligned with said annular throat and means tangentially introducing said gaseous medium into said plenum for inducing circular flow of said gaseous medium around the longitudinal axis of said plenum, whereby, a stable supersonic vortex flow of said gaseous medium is established through said annular throat.

4. A high power density laser comprising in combination,
   a. a gaseous medium,
   b. a cylindrical plenum having a structure defining an annular throat at one end axially aligned with the longitudinal axis thereof,
   c. means tangentially introducing said gaseous medium into said plenum for inducing circular flow of said gaseous medium around the longitudinal axis of said plenum,
   d. means for pumping said gaseous medium from said plenum through said throat at supersonic velocities, whereby a stable supersonic vortex flow of said gaseous medium is established,
   e. means for establishing an axially symmetric electrical glow discharge across said stable supersonic vortex flow of said gaseous medium for converting said flowing gaseous medium into flowing plasma and excited gaseous species having low translational temperatures and a population inversion therein,
   f. means for stimulating the emission of radiation energy from said flowing plasma and excited gaseous species for producing a laser beam.

5. The laser of claim 4 wherein said structure defining said annular throat comprises an anode member and a catode member electrically insulated from said anode member.

6. The laser of claim 5 wherein said means for establishing an electrical glow discharge having axial symmetry comprises,
   a. said anode member and said cathode member defining said annular throat,
   b. means establishing an electrical potential between said cathode member and said anode member for creating an electrical discharge across said annular throat, said supersonic vortex flow of said gaseous medium through said throat converting said electrical discharge into a stable glow discharge region having axial symmetry immediately downstream from said throat whereby said gaseous medium flowing supersonically through the glow discharge region is excited into plasma and excited gaseous species flowing at supersonic velocities.

7. The laser of claim 6 wherein the cathode member is a solid rod having a smooth spherical end, said spherical end having a diametric dimension greater than said rod, said rod being disposed along the longitudinal axis of said plenum and wherein the anode member is an annular sleeve defining a cylindrical orifice axially aligned with said rod, said orifice having a diametric dimension less than said diametric dimension of said spherical end of said rod, said orifice being disposed proximate to said spherical end of said rod, whereby an annular throat is defined, and wherein said electrical glow discharge region is anchored between the spherical end of said rod and the cylindrical wall of said orifice immediately downstream from said annular throat.

8. The laser of claim 7 wherein said gaseous medium comprises a mixture of helium gas and a gas within the class consisting of argon neon, xenon and krypton.

9. The laser of claim 7 further including means for reducing the flow velocities of said plasma and excited gas species from supersonic velocities to subsonic velocities.

10. The laser of claim 9 wherein said means for reducing the flow velocities of said plasma and excited gas species from supersonic velocities to subsonic velocities comprises,
   a. a tube integral with said annular sleeve of said anode member axially aligned with said cylindrical orifice and having an inside diametric dimension equal to that of said orifice for inducing turbulence in said plasma and excited gaseous species flowing at supersonic velocities from said glow discharge region, said tube having a length adapted for damping any induced shock waves, said tube having a constant cross-sectional flow area,
   b. an expansion nozzle having an increasing cross-sectional area axially aligned with said tube, having an entrance end of equal cross-sectional area to that of said tube adapted to receive said plasma and excited gas species flowing from said tube, said cross-sectional area of said nozzle increasing to a point where flow of said plasma and excited gaseous species becomes subsonic, said nozzle having an exhaust end fluidically connected to said means for pumping said gaseous medium.

11. The laser of claim 10 wherein said means for stimulating the emission of radiation energy from said flowing plasma and excited gaseous species comprises two spaced-apart reflective surfaces defining an optical cavity proximate the exhaust end of said nozzle, said optical cavity being oriented angularly with respect to the longitudinal axis of said nozzle, said reflective surfaces adapted to reflect stimulated emission radiation energy emitted from said plasma and excited gaseous species back and forth across said optical cavity for stimulating emission of radiation energy from the flowing plasma and excited gaseous species.

12. The laser of claim 11 wherein said optical cavity is oriented perpendicularly with respect to the longitudinal axis of said nozzle and wherein an active region within said optical cavity is provided by said plasma and excited gaseous species flowing at subsonic velocities from said exhaust end of said nozzle, said active region having a length approximately equal to the cross-sectional dimension of the exhaust end of said nozzle.

13. The laser of claim 12 wherein the optical cavity has a length much greater than the length of said active region.

14. The laser of claim 13 further including means for sweeping out and cooling plasma and gaseous species diffusing and scattering from said active region into other regions within said optical cavity.

15. The laser of claim 14 wherein one of said reflective surfaces defining said optical cavity is adapted to partially transmit stimulated emission radiation energy from said plasma and excited gas species whereby a laser beam emerges from said optical cavity.

16. The laser of claim 15 wherein said optical cavity has two axially aligned tubular arms oppositely extending from said active region, each tubular arm having a distal end, said reflective surfaces being mounted at the respective distal ends of said tubular arms, and wherein said means for sweeping out and cooling plasma and gaseous species diffusing and scattering from said active region comprises a gas leak into said extending arms proximate the distal ends thereof whereby a cooling and sweeping gas flow is established in the tubular arms from the distal ends thereof toward said active region, all gaseous species being exhausted from said optical cavity by said means for pumping said gaseous medium fluidically connected to said exhaust end of the expansion nozzle. on nozzle.

17. The laser of claim 16 wherein said gaseous medium comprises a mixture of nitrogen gas and carbon monoxide gas.

18. A high power density laser comprising in combination,
a. a gaseous medium,
b. a cylindrical plenum having a structure defining an annular throat at one end, axially aligned with the longitudinal axis thereof,
c. means tangentially introducing gaseous medium into said plenum for inducing circular flow of said gaseous medium around the longitudinal axis of said plenum,
d. means for pumping said gaseous medium from said plenum through said throat at supersonic velocities, whereby, a stable supersonic vortex flow of said gaseous medium is established.
e. means for establishing an axially symmetric electrical glow discharge across said stable supersonic vortex flow of said gaseous medium for converting said flowing gaseous medium into flowing plasma and excited gaseous species having low translational temperatures,
f. a gaseous lasing species,
g. means for introducing said lasing species into said flowing plasma and excited gaseous species, whereby, a population inversion is excited in a lasing energy state of said lasing species by collisional interaction with said plasma and excited gaseous species,
h. means for stimulating the emission of radiation energy from said excited lasing species for producing a laser beam.

19. The laser of claim 18, wherein said gaseous medium is helium gas and said lasing species are metallic vapors of the class consisting of cadmium, selenium and mercury.

20. The laser of claim 18 wherein said structure defining said annular throat comprises an anode member and a cathode member electrically insulated from said anode member.

21. The laser of claim 20 wherein said means for establishing an electrical glow discharge having axial symmetry comprises,
a. said anode member and said cathode member defining said annular throat,
b. means establishing an electrical potential between said cathode member and said anode member for creating an electrical discharge across said annular throat, said supersonic vortex flow of said gaseous medium through said throat converting said electrical discharge into a stable glow discharge region having axial symmetry immediately downstream from said throat whereby said gaseous medium flowing supersonically through the glow discharge region is excited into plasma and excited gaseous species flowing at supersonic velocities.

22. The laser of claim 21 wherein the cathode member is a solid rod having a smooth spherical end, said spherical end having a diametric dimension greater than said rod, said rod being disposed along the longitudinal axis of said plenum and wherein the anode member is an annular sleeve defining a cylindrical orifice axially aligned with said rod, said orifice having a diametric dimension less than said diametric dimension of said spherical end of said rod, said orifice being disposed proximate to said spherical end of said rod, whereby an annular throat is defined, and wherein said electrical glow discharge region is anchored between the spherical end of said rod and the cylindrical wall of said orifice immediately downstream from said annular throat.

23. The laser of claim 22 further including means for reducing the flow velocities of said plasma and excited gas species from supersonic velocities to subsonic velocities.

24. The laser of claim 23 wherein said means for reducing the flow velocities of said plasma and excited gas species from supersonic velocities to subsonic comprises,
a. a tube integral with said annular sleeve of said anode member axially aligned with said cylindrical orifice and having an inside diametric dimension equal to that of said orifice for inducing turbulence in said plasma and excited gaseous species flowing at supersonic velocities from said glow discharge region, said tube having a length adapted for damping any induced shock waves, said tube having a constant cross-sectional flow area, b. an expansion nozzle having an increasing cross-sectional area axially aligned with said tube, having an entrance end of equal cross-sectional area to that of said tube adapted to receive said plasma and excited gas species flowing from said tube, said cross-sectional area of said nozzle increasing to a point where flow of said plasma and excited gaseous species becomes subsonic, said nozzle having an exhaust end fluidically connected to said means for pumping said gaseous medium.

25. The laser of claim 24 wherein said means for stimulating the emission of radiation energy from said flowing plasma and excited gaseous species comprises two spaced-apart reflective surfaces defining an optical cavity being oriented angularly with respect to the longitudinal axis of said nozzle, said reflective surfaces adapted to reflect stimulated emission radiation energy emitted from said excited lasing species back and forth across said optical cavity for stimulating radiation of energy.

26. The laser of claim 25 wherein said optical cavity is oriented perpendicularly with respect to the longitudinal axis of said nozzle and wherein an active region within said optical cavity is provided by said plasma and excited gaseous species flowing at subsonic velocities from said exhaust end of said nozzle, said active region having a length approximately equal to the cross-sectional dimension of the exhaust end of said nozzle.

27. The laser of claim 26 wherein said means for introducing said lasing species comprises means for injecting and rapidly mixing said lasing species into said subsonic flow of plasma and excited gaseous species flowing from said exhaust end of said nozzle.

28. The laser of claim 27 wherein said means for rapidly mixing said lasing species uniformly into said flow of plasma and excited gaseous species includes the combination of, a. the tube integral with said annular sleeve of said anode member which induces and damps shock waves in said plasma and excited gaseous species flowing at supersonic velocity from said discharge region, b. the expansion nozzle which reduces the flow of plasma and excited gaseous species from said tube to subsonic velocities, whereby a highly turbulent subsonic flow region is established in said flowing plasma and gaseous species proximate said exhaust end of said expansion nozzle, c. means disposed within said expansion nozzle for injecting said lasing species into said highly turbulent subsonic flow region of said plasma and excited gaseous species said means being proximate the exhaust end of said expansion nozzle.

29. The laser of claim 28 wherein said gaseous medium is nitrogen gas and said lasing species is hydrogen fluoride and wherein said means for injecting and rapidly mixing said lasing species uniformly into said flow of plasma and excited gaseous species comprises means for injecting a mixture of hydrogen gas and sulfur hexafluoride gas whereby said plasma and excited gaseous species cause said sulfur hexafluoride gas molecules to disassociate into fluorine and sulfur, whereupon fluorine reacts with said hydrogen gas, said hydrogen fluoride molecule being in an excited vibrational state suitable for lasing.

30. The laser of claim 28 wherein said means for injecting said species comprises at least one hollow mixing bar, disposed parallel to said central longitudinal axis of said optical cavity across the exhaust of said nozzle perpendicular to the longitudinal axis of said nozzle, said bar having a plurality of small diameter ports along its length, and means for pumping said species into said hollow bar and out said ports.

31. The laser of claim 30 wherein said ports along the length of said mixing bar include a first row of ports each having an axis inclined upwardly with respect to a horizontal plane defined by said bar and a second row of ports each having an axis inclined downwardly with respect to said plane defined by said bar whereby two plumes of lasing species are injected into said highly turbulent subsonic flow region of said plasma and excited gaseous species.

32. The laser of claim 31 wherein the optical cavity has a length much greater than the length of said active region.

33. The laser of claim 32 further including means for sweeping out and cooling plasma and gaseous species diffusing and scattering from said active region into other regions within said optical cavity.

34. The laser of claim 33 wherein one of said reflective surfaces defining said optical cavity is adapted to partially transmit stimulated emission radiation energy from said lasing gas species whereby a laser beam emerges from said optical cavity.

35. The laser of claim 34 wherein said optical cavity has two axially aligned tubular arms oppositely extending from said active region, each tubular arm having a distal end, said reflective surfaces being mounted at the respective distal ends of said tubular arms, and wherein said means for sweeping out and cooling plasma and gaseous species diffusing and scattering from said active region comprises a gas leak into said extending arms proximate the distal ends thereof whereby a cooling and sweeping gas flow is established in the tubular arms from the distal ends thereof toward said active region, all gaseous species being exhausted from said optical cavity by said means for pumping said gaseous medium fluidically connected to said exhaust end of the expansion nozzle.

36. The laser of claim 35 further defined in that said bar has a circular cross-section and a diametric dimension, d, and is disposed across said expansion nozzle such that the maximum normal distance between the outside surface of said circular bar and said exhaust end of said expansion nozzle is equal to said diametric dimension, d.

37. The laser system of claim 36 further defined in that said annular sleeve defining said cylindrical orifice of said anode member and said tube integral therewith are composed of a material having a melting point in excess of 2500°K.

38. The laser of claim 37 wherein said annular sleeve and tube integral therewith is surrounded by an annular copper jacket having a cooling annulus, and means for circulating a coolant through said cooling annulus.

39. The laser of claim 38 further defined in that said expansion nozzle is integral with said copper jacket.

40. The laser of claim 39 further defined in that said cathode member is composed of a high melting point electron emissive material of the class consisting of thorium-tungsten alloys and tungsten.

41. The laser of claim 40 further including means for adjusting the position of said spherical end of said cathode with respect to said cylindrical orifice.

42. The laser system of claim 41 further defined in that said gaseous medium is nitrogen and said lasing species is carbon dioxide gas and hydrogen gas.

43. The laser of claim 42 wherein the partial pressure of plasma and excited nitrogen gaseous species ranges between 20 to 100 torr and wherein the partial pressure of said carbon dioxide gaseous species in said active region ranges between 10 to 100 torr and wherein the partial pressure of hydrogen in said active region ranges between 0 and 2 torr.

44. A gas laser comprising in combination,
   a. a gaseous laser gain medium,
   b. means for establishing a stable supersonic non-equilibrium plasma glow jet flow of said gaseous medium and establishing an axially symmetric electrical glow discharge across said supersonically flowing gain medium for exciting high vibrational and electronic temperatures and low translational temperatures in the gain medium creating a population inversion therein,
   c. means for stimulating the emission of radiation energy from said excited gain medium.

45. The laser of claim 44 wherein said gaseous gain medium is flowing and has pressure varying from 200 torr to 800 torr, and said means for stimulating is an optical resonant cavity which is oriented transversely with respect to gas flow.

46. The laser of claim 45 wherein said laser includes means for minimizing shock waves in the flowing gain medium within the stimulating area.

47. The laser of claim 46 wherein said gaseous gain medium comprises a mixture of nitrogen and carbon monoxide.

48. A gas laser comprising in combination,
   a. a gaseous medium,
   b. means for establishing stable supersonic non-equilibrium plasma glow jet flow of said gaseous medium and establishing an axially symmetric electrical glow discharge across said supersonically flowing medium for exciting high vibrational and electronic temperatures and low translational temperatures in said gaseous medium,
   c. means for introducing lasing gaseous species into said gaseous medium, whereby, a population inversion is excited in a lasing energy state of said lasing species by collisional interaction with said excited gaseous medium,
   d. means for stimulating the emission of radiation energy from said gaseous lasing species.

49. Laser of claim 48 wherein said gaseous medium has a pressure varying from 200 torr to 800 torr and said means for stimulating is an optical resonant cavity which is oriented transversely with respect to the direction of gas flow.

50. The laser of claim 49 wherein said optical cavity includes means for minimizing shock waves in the flowing gaseous species within the stimulating area.

51. The laser of claim 49 wherein said gaseous medium comprises nitrogen and said gaseous lasing species comprises carbon dioxide.

52. The laser of claim 51 wherein said plasma glow jet excites nitrogen into a metastable vibrational level and wherein said excited nitrogen excites said carbon dioxide by collisional interaction.

53. The laser of claim 52 wherein said carbon dioxide is injected into said excited nitrogen immediately adjacent to the stimulating area.

* * * * *